United States Patent [19]
Bombassei et al.

[11] 3,756,353
[45] Sept. 4, 1973

[54] SUPPORT DEVICE OF DISC BRAKE SHOES

[75] Inventors: Sergio Bombassei, Paladina; Alberto Bombassei, Bergamo, both of Italy

[73] Assignee: Societa'S. n. c. OMDS Officine Meccaniche di Sombreno, di Bombassei E Breda, Berrgamo, Italy

[22] Filed: Sept. 20, 1971

[21] Appl. No.: 181,903

[30] Foreign Application Priority Data
Nov. 28, 1970 Italy.............................. 70983 A/70

[52] U.S. Cl............................. 188/72.3, 188/73.5
[51] Int. Cl........................................... F16d 55/00
[58] Field of Search................ 188/72.3, 73.3, 73.5, 188/216

[56] References Cited
UNITED STATES PATENTS

| | | | |
|---|---|---|---|
| 3,450,234 | 6/1969 | Takata................................ | 188/73.3 |
| 3,294,205 | 12/1966 | Schanz................................ | 188/216 |
| 3,490,563 | 1/1970 | Hahm.................................. | 188/73.5 |
| 3,249,181 | 5/1966 | Muller................................. | 188/73.3 X |
| 3,318,420 | 5/1967 | Adams................................. | 188/72.3 X |
| 3,243,017 | 3/1966 | Kleinstuck.......................... | 188/72.3 |
| 3,396,824 | 8/1968 | Meier................................... | 188/73.3 X |
| 3,628,636 | 12/1971 | Beller.................................. | 188/73.5 X |

*Primary Examiner*—M. Henson Wood, Jr.
*Assistant Examiner*—Michael Mar
*Attorney*—Sughrue, Rothwell, Mion, Zinn & Macpeak

[57] ABSTRACT

A device for supporting the pads of a disc brake of the type having a pair of jaws between which extends the brake disc. The brake pads comprise plates having brake pads of frictional material on at least part of one face. The jaws carry two transverse pins on which the brake pads are mounted by means of holes in the plates which are rather larger than the pins so that the plates can pivot about a fulcrum defined adjacent the face of the plate remote from the face bearing the pad by the region of contact between the pins and a flat face on the inside of the holes. An intermediate pin which contacts the plate at a contact zone adjacent the face of the plate carrying the brake pad liner is biassed toward the mounting support pins so that the two plates are biased to rotate away from each other to disengage the pads from the brake disc when the brakes are not operated thereby ensuring that the brake disengages when the braking pressure is released.

5 Claims, 8 Drawing Figures

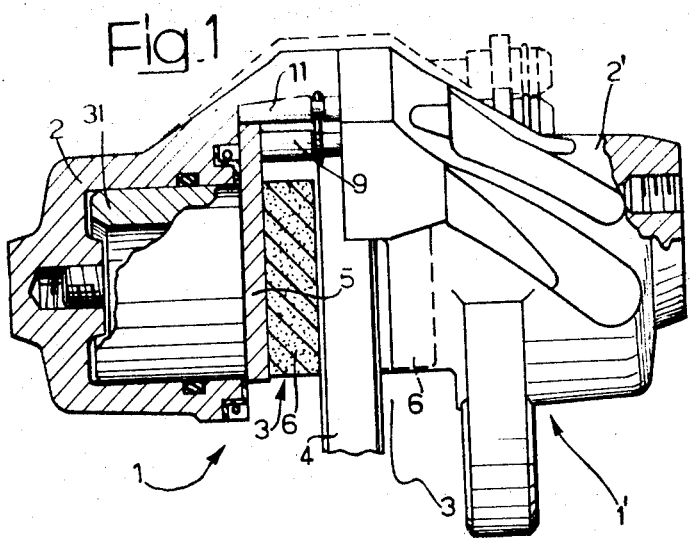
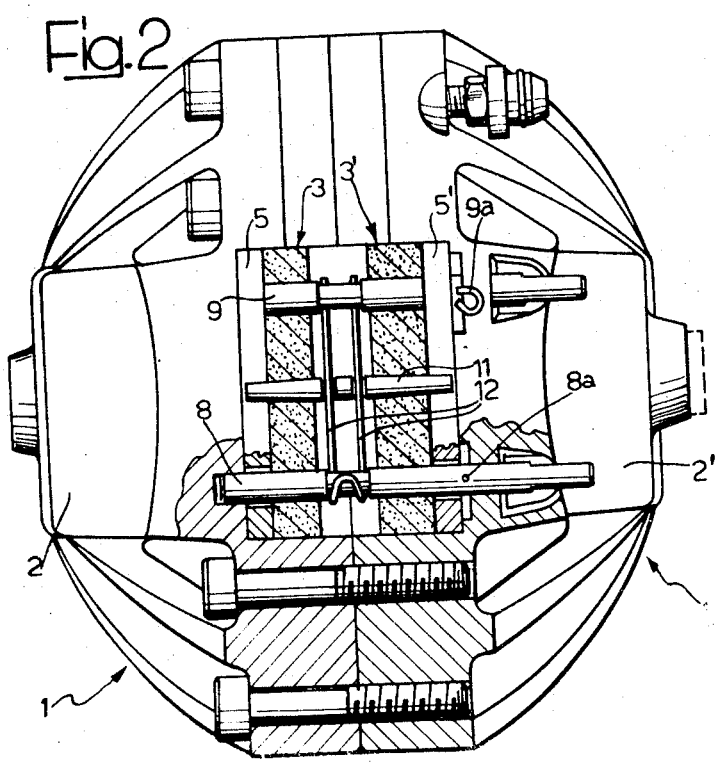

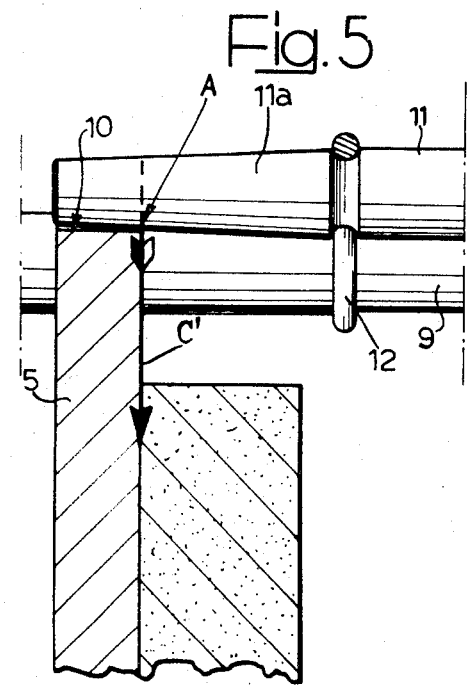
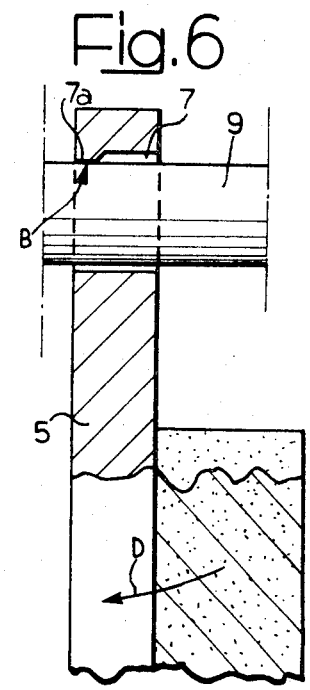
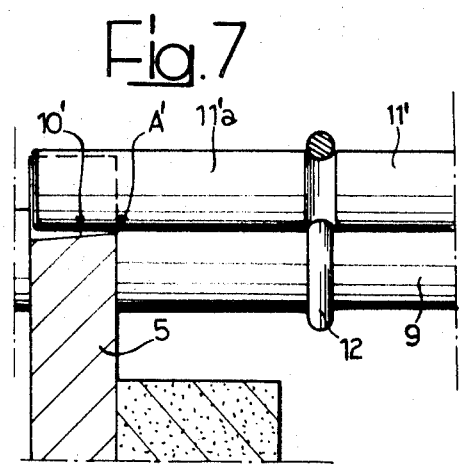
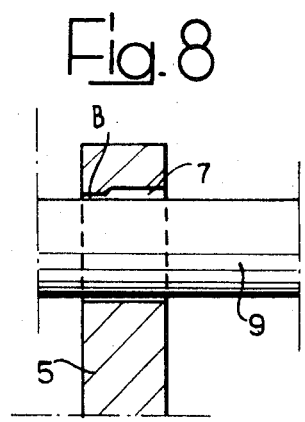

1

SUPPORT DEVICE OF DISC BRAKE SHOES

BACKGROUND OF THE INVENTION

The present invention relates to disc brakes for motor vehicles, and particularly to disc brakes of the type having a pair of jaws between which extends the brake disc, each jaw supporting a piston, which is subject to the hydraulic braking pressure and which acts to press a brake pad against the disc, the brake pads comprising a plate bearing a lining of friction material.

In particular, the present invention concerns brakes of the above mentioned type in which each of the two brake pads comprises a metal support plate covered with a lining pad of friction material upon one portion of the face adjacent the disc, and provided close to one edge with a pair of spaced holes for the sliding engagement of the plate on a pair of suspension pins. In disc brakes of this type there are normally provided means, acting upon the metal plates, for biassing the brake pads apart to effect detachment of the brake pads from the disc upon cessation of braking in order to avoid continuous contact between the brake pads and the disc which would induce heating of the component parts and unnecessary wear of the friction material of the pad lining.

The biasing devices which have so far been used for this purpose do not satisfactorily solve the problem of detachment of the brake pads because they are of complicated construction, and they do not entirely ensure the absence of vibration. Moreover, known devices render particularly laborious the assembly and dismantling of the said brake pads.

SUMMARY OF THE INVENTION

According to the present invention there is provided a device for supporting the pads of a disc brake, of the type comprising a pair of jaws between which the disc extends, the jaws supporting respective pistons which move in response to the braking pressure to effect engagement of two brake pads with the brake disc, each brake pad comprising a plate having a lining of friction material over at least part of one face and a pair of spaced holes through which extend a pair of support pins on which the plates are slidingly mounted, and means for resiliently biasing the brake pads apart, in which the said holes in plates and the said support pins are shaped to cooperate in forming a fulcrum at the edge of the said holes opposite the face bearing the brake pad liner, one edge of each plate having a notch in which there engages a third pin intermediate the two support pins, the intermediate pin and the notch being shaped so that the region of contact between them is adjacent the face of the plate bearing the brake pad liner, and there being provided biasing means biasing the intermediate pin toward the brake pad liners thereby creating a torque which tends to rotate the brake shoes away from each other about said fulcra.

Various other features and advantages of the present invention will become apparent from the following description, given purely by way of non-restrictive example, with reference to the accompanying drawings.

BRIEF DESCRIPTION OF THE DRAWINGS

FIG. 1 is a partially cut away end view of a disc brake provided with a support device for the brake pads constructed in accordance with the invention;

FIG. 2 is a partly cut away plan view of the embodiment illustrated in FIG. 1;

FIGS. 5 and 6 are two cross sections of the brake pad of FIG. 4, taken along the lines V—V and VI—VI of FIG. 4; and FIGS. 7 and 8 are similar to FIGS. 5 and 6, and show part of a second embodiment of the invention.

DESCRIPTION OF THE PREFERRED EMBODIMENTS

Figure 3:
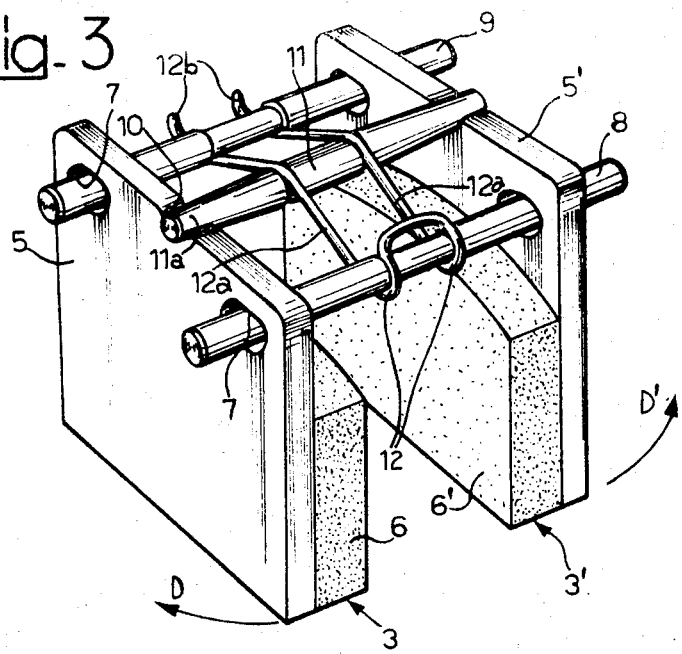
FIG. 3 is a diagrammatic perspective view of the essential components of the support device of the present invention.
Figure 4:
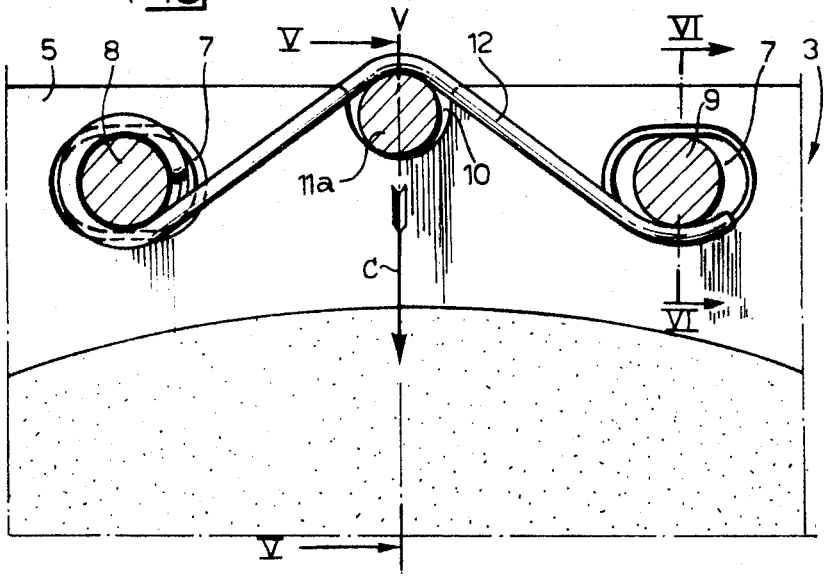
FIG. 4 is a front view of a brake pad showing the pins in section.

Referring now to FIGS. 1 to 6 there is shown a motor vehicle disc brake having jaws 1 and 1' in which are mounted brake cylinders 2, 2' in which slide the pistons 31, only one of which can be seen in FIG. 1. Two brake pads 33' which are operated by the brake cylinders 2, 2' act upon a rotating disc 4 which is mounted for rotation with the wheel to be braked.

Each brake pad 3, 3' consists of a metal plate 5,5' to which is secured a liner 6, 6' of friction material.

The brake pad supporting device includes a pair of removable transverse pins 8, 9 which pass through elongated holes 7 in the upper portion of the plates 5, 5' and are supported at their ends in seats of the two jaws 1, 1'. The pins 8, 9, are retained axially by split pins 8a, 9a and the holes 7 in the plates 5, 5' are larger than the diameter of the pins 8, 9 so that the brake pad is mounted with a certain amount of play. Each of the two holes 7 has, at its end adjacent the face of the plate opposite that bearing the lining pad of friction material 6, 6', a radially inwardly directed shoulder 7a (see FIG. 6). Each brake pad 3, 3' is therefore able to rotate over a small angle with respect to the suspension pins 8, 9, around the fulcrum defined by the contact zones B between the shoulders 7a and the pins 8, 9.

Each plate 5, 5' has a notch 10 near the centre part of its upper edge. Each notch 10 is substantially semi-cylindrical. In the notches 10 there engage the frusto-conical ends 11a of an intermediate pin 11; as a result of the conical shape of the ends of the pin contact between the pin 11 and the notches 10 occurs only at the edge of each notch 10 adjacent the face of the plate bearing the lining pad 6, 6' of friction material, as shown marked at A in FIG. 5.

A torque spring 12, consisting of two parallel arms 12a shaped as an inverted V, acts at its ends upon the lower surface of the two pins 8 and 9 with its middle portion upon the upper surface of the intermediate pin 11. At one end of the spring the two arms 12a are joined together and at the other end the two are turned upwards as shown at 12b. By acting upon the two fixed pins 8 and 9 the spring 12 exerts upon the intermediate pin 11 a downward thrust as shown by the arrow C in FIG. 4. This thrust is transmitted to the plates 5, 5' at the points of contact A, giving rise to forces in a direction and along a line shown by the arrow C' of FIG. 5. When the pistons 3 are not exerting a braking force the biasing action of the spring 12 causes the two plates to rotate away from each other in the directions shown by the arrows D and D' in FIG. 3.

In the second embodiment illustrated in FIGS. 7 and 8, the ends 11'a of the intermediate pin 11' are cylindrical, whilst the notches 10' of the plates 5, 5' are frusto-conical with the bottom inclined towards the face opposite to that bearing the pad of friction material. Again, contact between the pin 11.' and the notches 10' occurs at the edge of each notch adjacent the face of the plate bearing the pad of friction material, as shown at A' in FIG. 7.

The support device described above has great simplicity of construction and is easy to assemble and dismantle and its operation is independent of the degree of wear of the liner of friction material. Moreover, the action of the spring 12 is such as to prevent the brake pad from causing vibrations.

Also, the slightly inclined position which the brake pads assume, with respect to the brake disc, in the rest position assists the expulsion of water from between the brake pad and the disc thus ensuring a more rapid response of the brakes when braking in rainy conditions than known devices in which the brake pads always remain parallel to the brake disc.

Naturally, the principle of the invention remaining the same, the forms of realization and the details of construction can be widely varied in regard to what has been specified and illustrated, without nevertheless going beyond the scope of this invention.

What is claimed is:

1. In a device for supporting the pads of a disc brake, of the type comprising,
    a pair of jaws between which the disc extends,
    a pair of support pins mounted on said jaws
    respective pistons mounted on said jaws
    respective brake pads operatively connected to said pistons, said pistons moving in response to the braking pressure to effect engagement of said brake pads with said brake disc,
    each of said brake pads comprising a plate having a lining pad of friction material over at least part of one face thereof and a pair of spaced holes by means of which said plates are slidingly mounted on said support pins and
    resilient biasing means for resiliently biasing said brake pads apart,
    the improvement wherein:
    said holes in said plates and said support pins are shaped to cooperate in forming a fulcrum at the edge of said holes opposite the face bearing said brake pad liner,
    the edge of each plate remote from said liner, having a notch intermediate said holes,
    a third pin intermediate said two support pins, said intermediate pin engaging said notch, said pin and said notch being shaped so that, the region of contact there between is adjacent that face of said plate bearing said brake pad liner
    said resilient biasing means biasing said intermediate pin toward said brake pad liners thereby cresting a torque which tends to rotate said brake pads away from each other about said fulcra.

2. The device of claim 1 wherein said resilient biasing means comprise a torque spring having two substantially parallel V-shaped arms acting at their ends upon one face of each of said two support pins and at their centre portions upon the opposite face of said intermediate pin.

3. The device of claim 1, wherein each of said two holes in each of said plates has, at its end adjacent that face of said plate opposite that bearing said brake pad liner of friction material, a shoulder portion bearing against said support pins to define said fulcra.

4. The device of claim 1 wherein said notch of each said plate is of a semi-cylindrical form and the ends of said intermediate pin which engage said notches of said plates are frusto-conical in shape.

5. The device of claim 1 wherein said notch of each said plate is frusto-conical and inclined towards that face of said plate opposite that which bears said lining pad of friction material, and wherein the ends of said intermediate pin which engage said notches in said plates, are cylindrical in shape.

* * * * *